United States Patent [19]

Haneda et al.

[11] Patent Number: 4,996,634
[45] Date of Patent: Feb. 26, 1991

[54] BUMPER REINFORCEMENT FOR AUTOMOTIVE VEHICLES

[75] Inventors: Shinichi Haneda, Aichi; Haruhiko Terada, Obu; Kazunari Azuchi, Himi; Kiyohito Gyobu, Toyama, all of Japan

[73] Assignees: Aisin Seiki Kabushiki Kaisha; Aisin Keikinzoku Kabushiki Kaisha, both of Japan

[21] Appl. No.: 501,926

[22] Filed: Mar. 30, 1990

[30] Foreign Application Priority Data

Mar. 31, 1989 [JP] Japan .................. 1-36336[U]

[51] Int. Cl.⁵ ............................. B60Q 1/28
[52] U.S. Cl. ........................ 362/82; 293/117
[58] Field of Search ............ 362/821, 365, 376, 390; 293/117

[56] References Cited

U.S. PATENT DOCUMENTS 4,213,644 7/1980 Scrivo et al. .................. 293/117
4,270,787 6/1981 Savell ........................ 362/82 X

FOREIGN PATENT DOCUMENTS 177747 10/1983 Japan .
43149 3/1984 Japan .
30570 7/1985 Japan .

Primary Examiner—Stephen F. Husar
Attorney, Agent, or Firm—Finnegan, Henderson, Farabow, Garrett & Dunner

[57] ABSTRACT

A vehicular bumper reinforcement to which a rear portion of a bumper shell mounting a lamp is secured includes a vertical front wall having a cut-out portion through which a mounting portion of the lamp is passed, a vertical rear wall having a cut-out portion through which the lamp is capable of moving at the time of a collision, and flanges provided above and below the cut-out portions and spaced apart from each other by a distance somewhat greater than the height of the lamp mounting portion. At least one hollow portion formed integral with the reinforcement is provided above and below each of the flanges.

3 Claims, 4 Drawing Sheets 4,996,634

1

BUMPER REINFORCEMENT FOR AUTOMOTIVE VEHICLES

BACKGROUND OF THE INVENTION

This invention relates to a reinforcement constituting the bumper of an automotive vehicle.

For reasons of design, there has recently been an increase in the number automotive vehicles in which the parking lamps are accommodated in the corners of a bumper, as shown in FIG. 1. In order to secure the space needed for accommodating these lamps, part of the bumper shell and reinforcement must be cut away. This not only diminishes the collision strength of the bumper corner but also leads to possible lamp damage at the time of a collision.

FIG. 7 illustrates the structure of a conventional bumper made of resin, as disclosed in the specification of Japanese Pat. Application Laid-Open (KOKAI) No.58-177747. In the example shown in FIG. 7, a turn-signal lamp 22 is fitted in a bumper 21, in which case a shock absorber 24 is provided in the front portion of a reinforcement 23 having a generally rectangular cross section. The surface of the shock absorber 24 is covered by a bumper shell, and there are provided a lamp accommodating recess 26 and an engaging hole 28 for fixing an external cylinder 27. An opening 29 for preventing interference of the external cylinder 27 is provided to the rear of the engaging hole 28, and the surface of an opening 30 provided in the front wall of the reinforcement 23 is covered by a covering portion 32.

FIG. 8 illustrates a conventional automobile bumper disclosed in the specification of Japanese Utility Model Publication (KOKOKU) No. 59-43149. The back side of a bumper body 23 is provided with a reinforcing plate 34 extending over the entire length of the bumper in the width direction of the vehicle. The reinforcing plate 34 is provided with a through-hole 36 at a portion thereof joined to a bumper stay 35, and a mounting piece 37 for effecting mounting to the reinforcing plate is provided with a hollowed-out portion 38. Numeral 39 denotes a lamp.

FIG. 9 shows a conventional vehicle bumper disclosed in the specification of Japanese Pat. Publication (KOKOKU) No. 60-30570. Here a lamp assembly 41 attached to a bumper 40 has a housing 42 fixed to the upper plate of a beam 43. Numeral 44 denotes a lamp body capable of sliding along a guide groove 46 provided in a side wall 45 of the housing 42. Numeral 47 denotes a lens having a lamp 48 and a socket 49 disposed on the inner side of the lens. Numeral 50 denotes a spring connecting the housing 42 to a retaining lug of the lamp body 44.

With the bumper structure of FIG. 7, damage to the outer cylindrical body 27 of the turn-signal lamp 22 at the time of a collision is prevented by the shock absorber 24 and the covering portion 32 of the front wall 31 of reinforcement 23. However, it is almost impossible for the signal lamp 22 to recede accurately in the central direction of the vehicle at the time of a collision, and the outer cylinder 27 encountered interference from a peripheral flange 31a of the reinforcement 23. Though the flange portion 31a has the covering portion 32, the latter is soft for the purpose of providing protection. Consequently, when the outer cylinder 27 encounters interference, the covering portion 32 is compressed and therefore hardened. As a result, suitable protection cannot be provided and the outer cylinder 27 may be damaged at impact.

In the automobile bumper of FIG. 8, the lamp 39 attached to the bumper body 33 is shifted to the rear at the time of impact, but the reinforcing plate 34 on the back side of the bumper body 33 curves in the rearward direction to produce a space that allows movement, thereby preventing damage. However, since the bumper body 33 is made of a synthetic resin, it undergoes a large amount of change at impact and the lamp 39 interferes with the periphery of the through-hole 36, as a result of which the lamp is damaged. Though this problem can be solved if the space S is enlarged, this is difficult in terms of the vehicle structure.

In the case of the vehicle bumper shown in FIG. 9, the lamp assembly 41 is displaced at the time of a collision, after which it is restored to its original position by the spring 50. Since this structure constitutes a single unit, it is very complex and high in cost.

SUMMARY OF THE INVENTION

Accordingly, an object of the present invention is to provide a vehicle bumper reinforcement in which there is no decline in strength, and which is capable of preventing damage to a lamp at the time of a collision.

According to the present invention, the foregoing object is attained by providing a vehicular bumper reinforcement for having a rear portion of a bumper shell mounting a lamp fixedly secured thereto, comprising a vertical front wall having a cut-out portion through which a mounting portion of the lamp is passed, a vertical rear wall having a cut-out portion through which the lamp is capable of moving at the time of a collision, and flanges provided above and below the cut-out portions and spaced apart from each other by a distance somewhat greater than the height of the lamp mounting portion, at least one hollow portion formed integral with the reinforcement provided above and below each of the flanges.

In operation, the lamp recedes along with the mounting portion due to deformation of the bumper shell at the time of a collision. Since the vertical front and rear walls of the reinforcement are formed to include the cut-out portions size to permit movement of the lamp mounting portion, the lamp is capable of moving through the reinforcement without being damaged.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
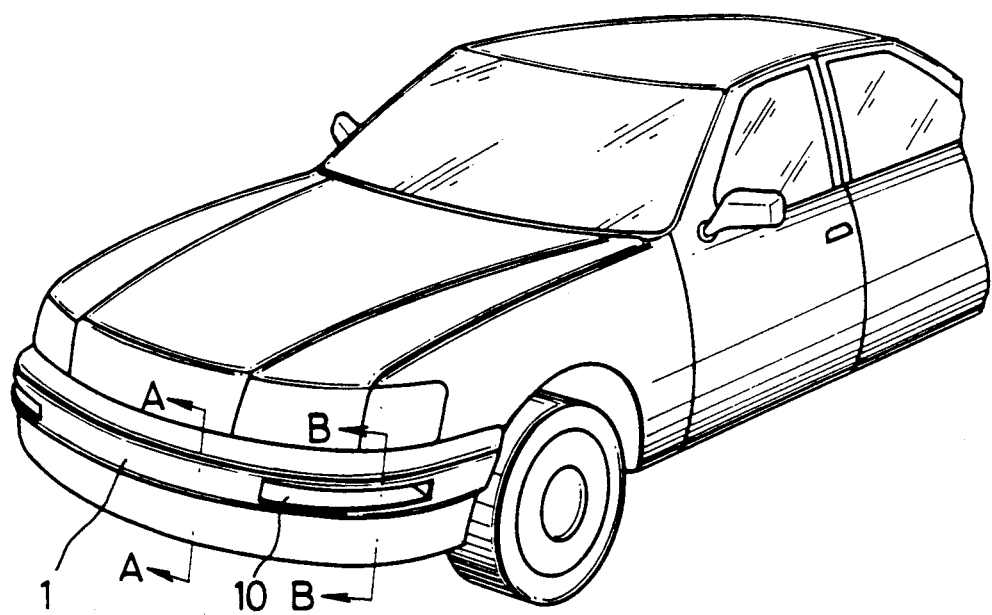
FIG. 1 is a perspective view illustrating an automotive vehicle equipped with a bumper reinforcement embodying the present invention.
Figure 2:
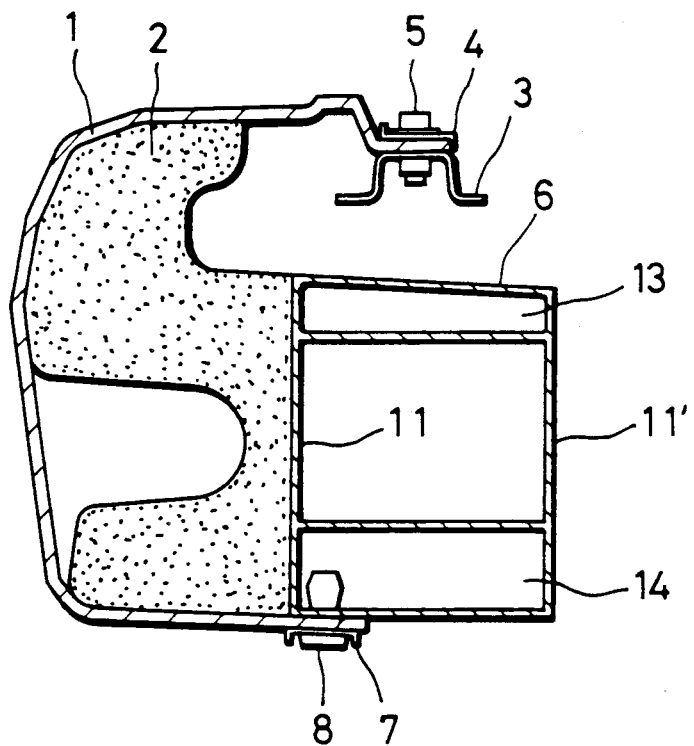
FIG. 2 is an enlarged sectional view taken along line A—A of FIG. 1.

Embodiments of the present invention will now be described in detail with reference to FIGS. 1 through 6.

In a first embodiment of the invention shown in FIGS. 1 through 4, a bumper shell 1 is fixedly secured by a bolt 5 and a clip 8 to a support body 3 and a reinforcement 6 via shell retaining plates 4 and 7. The reinforcement 6 is an extruded (or drawn) member and therefore is very easy to manufacture. The reinforcement consists of a light alloy, a fiber-reinforced plastic or the like.

Figure 3:
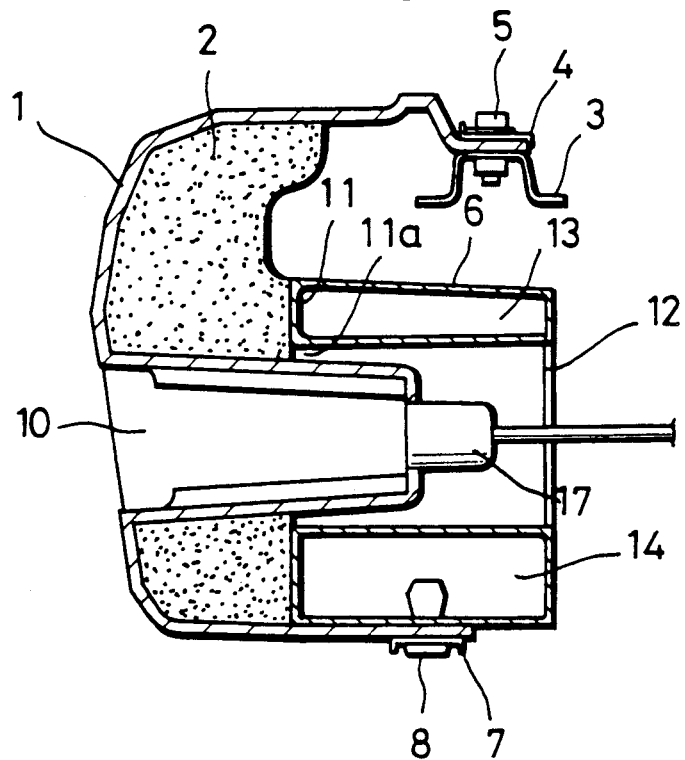
FIG. 3 is an enlarged sectional view taken along line B—B of FIG. 1.

FIG. 3 illustrates a signal lamp portion of a bumper using the reinforcement 6 of the first embodiment. The reinforcement 6 has a longitudinal front wall 11 formed to have a cut-out portion 11a in order to provide enough space for accommodating a signal lamp 10 attached to the bumper shell 1. The lamp 10 has a bulb 17. Though there is some risk of inadequate strength in this case, hollow portions 13, 14 are formed in the upper and lower parts of the reinforcement 6 to minimize the decline in strength. The cut-out portion 11a in the longitudinal front wall 11 and a cut-out portion 12 in a longitudinal rear wall 11' are useful in lowering cost since pressing work can be performed using the hollow portions 13, 14 as bases. Numeral 2 denotes a shock absorber consisting of urethane foam or the like.

Figure 4:
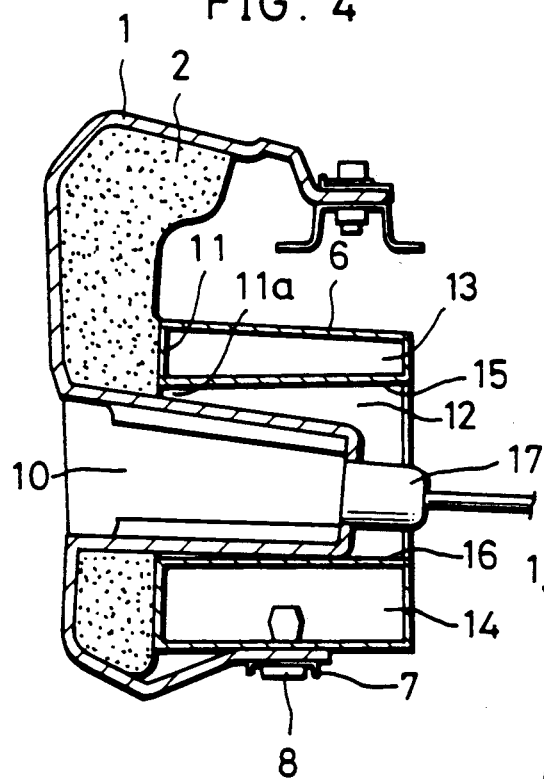
FIG. 4 is a side sectional view showing the state of the bumper after it is deformed by a collision.

FIG. 4 shows the structure of FIG. 3 in a state deformed due to a collision. It will be appreciated that the shock absorber 2 is compressed owing to deformation of the bumper shell 1. The signal lamp 10 attached to the bumper shell 1 moves in the direction of the center of the vehicle so as to slide within flanges 15, 16 provided above and below the cut-out portions 11a, 12 of the reinforcement 6. Owing to the cut-out portions 11a, 12 of the longitudinal front and rear walls 11, 11', the bulb 17 of the lamp 10 does not encounter any interference. As a result, the lamp 10 is prevented from being damaged.

Figure 5:
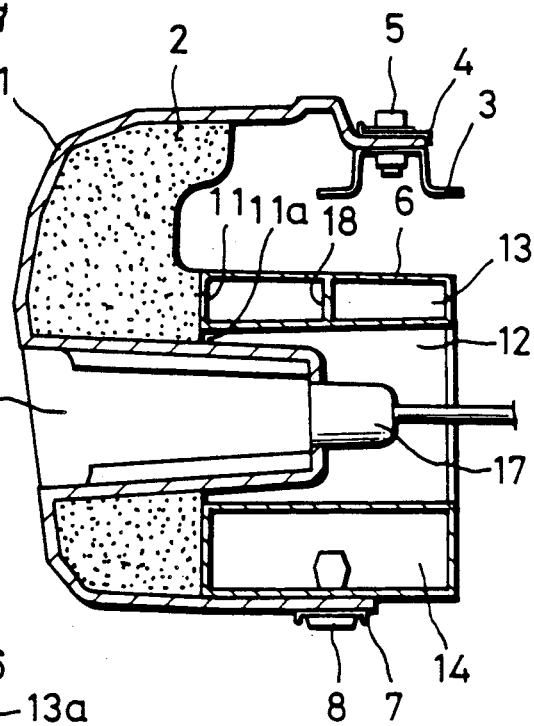
FIGS. 5 and 6 are sectional side views illustrating embodiments different from that shown in FIG. 3.

FIG. 5 illustrates a second embodiment of the invention, in which the interior of the hollow portion 13 at the upper part of the reinforcement 6 is provided with a vertically extending partitioning plate 18 to reinforce the hollow portion 13. Other structural components are the same as those shown in FIG. 3.

Figure 6:
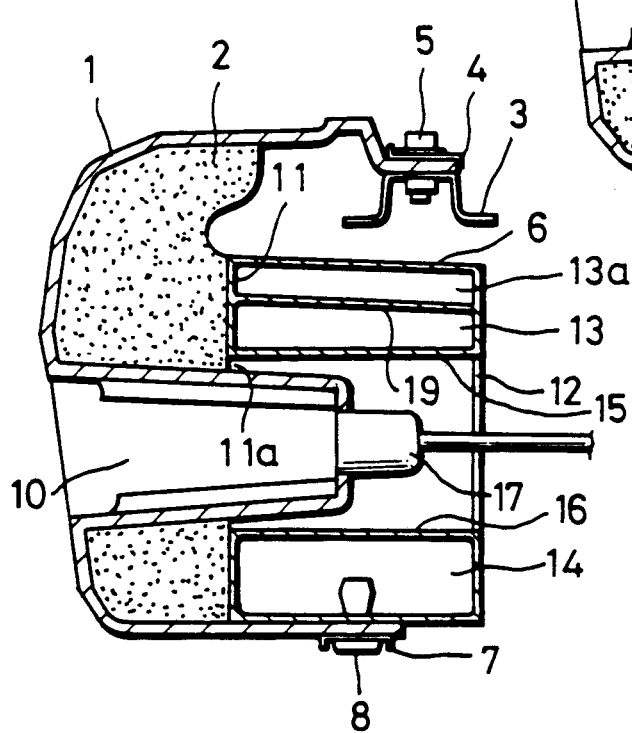
Figure 7:
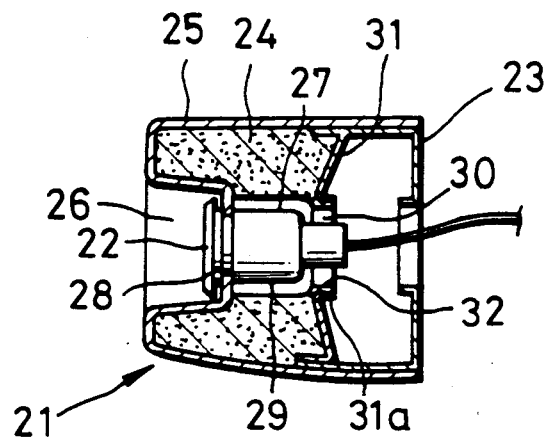
FIG. 7 is a side sectional view of a vehicle bumper according to the prior art.
Figure 8:
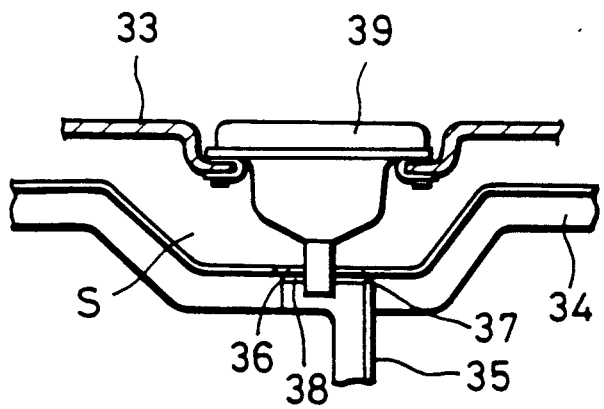
FIGS. 8 and 9 sectional views of prior-art vehicle bumpers different from that of FIG. 7.
Figure 9:
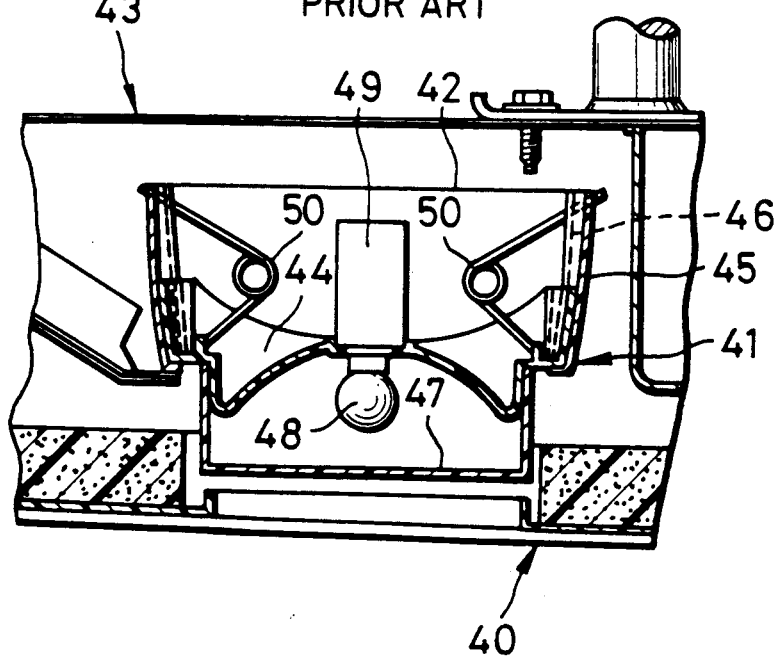

FIG. 6 illustrates a third embodiment of the invention, in which the interior of the hollow portion 13 at the upper part of the reinforcement 6 is divided horizontally by a reinforcing plate 19 to form another hollow portion 13a above the hollow portion 13, thereby increasing strength. Other structural components are the same as those shown in FIG. 3.

Thus, in accordance with the present invention as described in detail above, the longitudinal front and rear walls of the reinforcement are formed to have cut-out portions that allow the lamp to pass therethrough at the time of a collision. Specifically, owing to deformation of the bumper shell when the vehicle is involved in a collision, the lamp is capable of making a sliding stroke along the flanges provided above and below the cut-out portions, as a result of which the lamp is prevented from being damaged. Since the hollow portion is provided at least above or below the flanges of the reinforcement, the strength of the reinforcement at impact is sufficient. Moreover, the present invention does not require any special parts and is simple in structure. This contributes to lower cost.

As many apparently widely different embodiments of the present invention can be made without departing from the spirit and scope thereof, it is to be understood that the invention is not limited to the specific embodiments thereof except as defined in the appended claims.

What is claimed is:

1. A vehicular bumper reinforcement for having a rear portion of a bumper shell mounting a lamp fixedly secured thereto, comprising:
   a vertical front wall having a cut-out portion through which a mounting portion of the lamp is passed;
   a vertical rear wall having a cut-out portion through which the lamp is capable of moving at the time of a collision; and
   flanges provided above and below the cut-out portions and spaced apart from each other by a distance somewhat greater than the height of the lamp mounting portion; said flanges being connecting integrally both said walls,
   at least one hollow portion formed integral with the reinforcement and provided above and below each of said flanges.

2. A vehicle bumper reinforcement according to claim 1, wherein said hollow portion is partitioned by vertically or horizontally extending plate.

3. A vehicle bumper reinforcement according to claim 1, wherein said each flange has a flat surface sufficient to make a sliding stroke of the lamp along said flat surface at the time of collision of the vehicle.

* * * * *